United States Patent [19]

Spannhake

[11] 3,757,043

[45] Sept. 4, 1973

[54] TELEVISION RECEIVER WITH VIDEO AMPLIFIER PROTECTED FROM HIGH-VOLTAGE FLASH-OVER

[75] Inventor: Dieter Spannhake, am Alten Bahnhof, Germany

[73] Assignee: Fernseh GmbH Darmstadt, Darmstadt, Germany

[22] Filed: Dec. 7, 1971

[21] Appl. No.: 205,672

[30] Foreign Application Priority Data

Dec. 10, 1970 Germany .................. P 20 60 749.2

[52] U.S. Cl. .............................. 178/7.5 R, 307/202

[51] Int. Cl. .......................... H04n 5/44, H04n 5/68

[58] Field of Search ...................... 178/7.3 R, 7.5 R, 178/DIG. 11; 307/202

[56] References Cited

UNITED STATES PATENTS 3,466,390 9/1969 Inamiya et al. .................. 178/7.5 R

*Primary Examiner*—Robert L. Richardson
*Attorney*—Carroll B. Quaintance et al.

[57] ABSTRACT

A system for protecting a video output amplifier from damage due to flash-over in a picture tube by providing separate electrically isolated ground points respectively for the electrodes of the tube controlled by and not controlled by the amplifier, and for capacitively coupling the power supply lines of the amplifier to one of the ground points.

8 Claims, 4 Drawing Figures

TELEVISION RECEIVER WITH VIDEO AMPLIFIER PROTECTED FROM HIGH-VOLTAGE FLASH-OVER

BACKGROUND OF THE INVENTION

1. Field of the Invention

The invention relates to the protection of transistorized video amplifiers in television receivers, preferably color television receivers, from flash-over of the high-voltage in the picture reproducing tube, and relates particularly but not exclusively to the circuit of the ground connections of the video output stages and the electrodes of the picture tube.

2. Description of the Prior Art

The tendency to exclusively use transistors in television receivers has resulted in the situation that the video output amplifier, which is directly connected to the picture tube, is severely endangered by occasional high-voltage flashover in the picture tube, and is exposed to the possibility of being ruined. To reduce the danger of damage in the low-voltage devices which are connected to the picture tube, the electrodes of the picture tube, including the control electrodes, have been provided with protection spark gaps, thereby achieving a certain degree of safety. However, it is still possible for high voltage peaks to reach the video amplifier output stage due to random spark lags in these spark gaps, such voltage peaks causing damage in the video amplifier output stage. This difficulty hitherto prevented an improvement, desirable in itself, in the efficiency of the video output stage, especially in color television receivers. This improvement provides for keeping the connecting leads between the video output stage and the tube base as short as possible. By means of an arrangement of this kind, it was in fact possible for both the voltage drop of the video signals on the connecting leads between amplifier and the tube base and the inductive disturbance on adjacent leads to be substantially reduced. In the case of color television receivers, this would give an arrangement in which the three (or four) output transistors are mounted directly beside the tube base on the base plate.

In the present state of the art however, such a shortening of the leads is not possible because the output transistors are directly exposed to the steep voltage fronts of the flashover phenomena, that is to say, without the damping effect of the supply leads. The transistors of the video output stages were therefore left on grounded video plates which were directly connected to the chassis and which were located for example at the base of the receiver housing.

SUMMARY OF THE INVENTION

The present invention provides a protective circuit such that the transistor or transistors of the video output stage or stages can be mounted directly on or at the base plate of the picture tube.

One embodiment of the invention provides, in a circuit for operating a picture reproducing tube which includes direct-current voltage sources for focussing and accelerating the electron beam, and transistors for controlling the beam intensity, and in which the electrodes of the picture tube are entirely or partially protected from voltage break-through or high-voltage by flash-over spark gaps, that in accordance with the invention, the flash-over spark gaps of those electrodes of the picture tube which are not used for controlling the beam intensity are connected to a first ground point, and the flashover spark gaps which belong to the control electrode or electrodes are connected to a second ground point which is galvanically separated from the first ground point on the picture tube base plate and which is capacitively coupled to the operating voltages of the video output stage on the picture tube base plate. The blocking capacitors for the operating voltages of the grid electrodes are advantageously also connected to the second ground point.

When using the invention, it becomes possible for the output transistors of the video amplifiers to be mounted in the direct vicinity of the tube base. When a flash-over occurs from the anode to the grid electrodes of the color picture tube, the spark gaps at these electrodes will fire first and lift the ground potential of the first ground point without changing the potential of the second ground point. If the flash-over also passes to the cathode, then after firing of the protective spark gap at the cathode, the second ground point is raised in potential, and thus also, by way of the capacitive coupling, are the operating voltages for the video output transistors. In this case the emitter is also raised by way of the base-emitter path.

In this way, the voltage differences between the electrodes of the video output transistor are kept very low, and thus the transistor is protected from serious damage, while the transistors on the video plate which is connected to the chassis are protected by the relatively high inductance of the supply lead. If the spark at the cathode of the picture tube should have a firing lag of few micro-seconds, the voltage rising at the video output stage is limited by way of a diode $D_1$ by the operating voltage of a capacitor C5.

This invention therefore provides the possibility of placing the output transistor for each of the control electrodes of the picture tube on the base plate, and thus substantially reducing the power loss and radiation to the supply leads. It is particularly advantageous for the picture tube to be controlled by means of a cascade stage, the lower transistor of which is located close to the chassis on a special video plate, and the upper transistor of which is located close to the base of the picture tube. The two transistors can be connected by an unscreened lead, because the transistor on the video plate adjacent to the chassis operates as a current driver on a very low-resistance input of the transistor located on the picture-tube base plate. The voltage signal on this supply lead is therefore small and therefore does not cross-talk onto adjacent signal leads. This connection can also be made by a low-resistance cable of, for example, 60-ohm characteristic impedance. The supply lead is then also protected from outside interferences by the cable sheathing.

Description of the Preferred Embodiments

Figure 1:
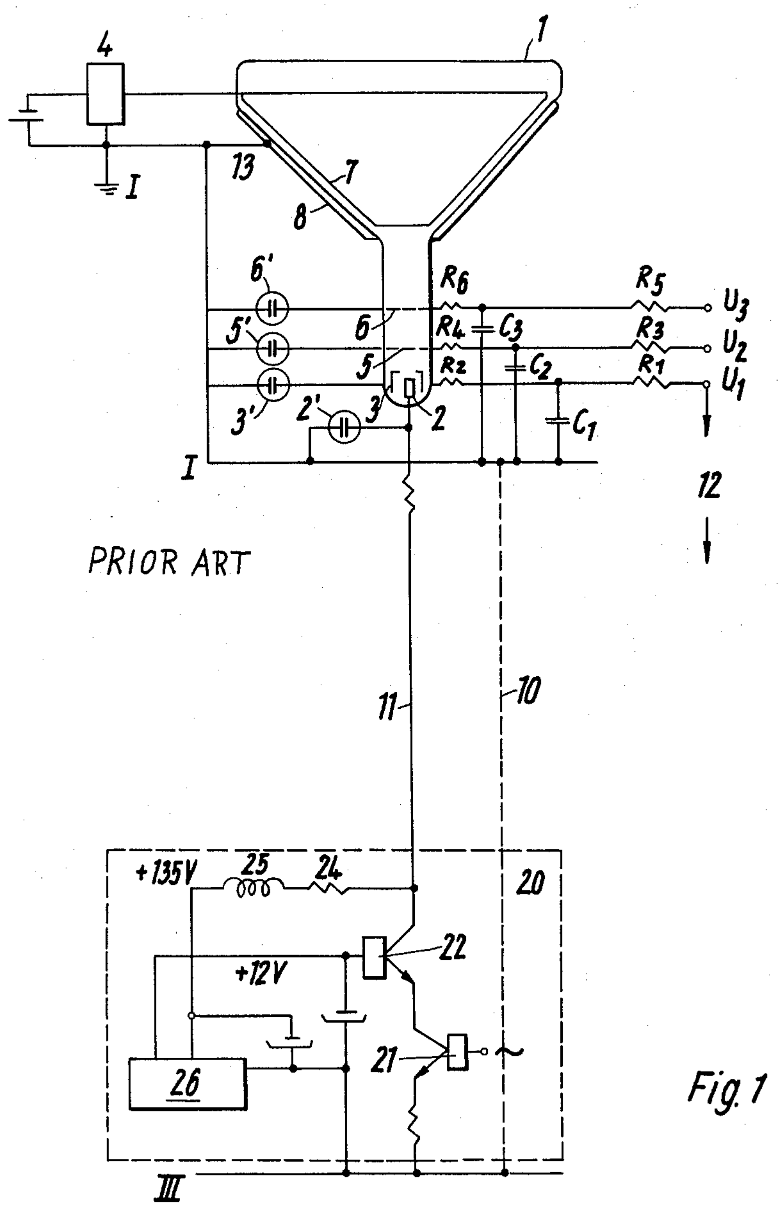
FIG. 1 is a schematic diagram of a known television receiver circuit with conventional grounding.

Present-day television picture reproducing tubes are generally protected from high-voltage flash-over by connection of the electrodes of the picture tube to a collecting ground by way of discharge paths, so that the released discharge energy is drained off. An example of this is shown in FIG. 1. In FIG. 1 is a picture reproducing tube 1 having a cathode 2, a Wehnelt electrode 3, a screen grid 5, a focussing electrode 6 and an anode 7 arranged in a conventional circuit. This diagrammatic view is also intended to extend to color picture tubes in which, instead of one beam system, there are three beam systems, and therefore at least the electrodes 2, 3 and 5, and the supply leads thereof occur three times. A high-voltage device 4 is provided from which the voltage for the anode 7 and possibly also the operating voltages U2 and U3 for the electrodes 5 and 6 are to be taken.

To protect the tube and the circuit elements from flash-over of the anode voltage in the tube, the circuit includes the discharge spark gaps 2′, 3′, 5′ and 6′ to serve as protection paths. The base points of the spark gaps are all connected to a first high-voltage ground point I, which is connected to an external coating 8 of the tube by way of an extra separate ground lead 13. These flash-over gaps or paths are generally disposed, together with the decoupling members $C_1$, $R_1$, $R_2$, $C_2$, $R_3$, $R_4$, and $C_3$ $R_5$ $R_6$ for the screen grid voltages, on a socket plate to which the socket of the tube 1 is secured. The control voltage for varying the beam intensity and the biassing voltage for the Wehnelt electrode 3 are usually taken from a circuit which is located on a video circuit board 20 remote from the picture tube and which is connected to the picture tube by way of leads 10, 11 and 12. The circuits on the video circuit board 20 are grounded by the chassis ground point III. Also related thereto is the mains power pack 26 which supplies operating voltages of 12 volts and 135 volts for the video output stage 21 and 22. It can also deliver the biassing voltage $U_1$ for the Wehnelt electrode 3. High-voltage ground point I and chassis ground point III are connected galvanically by line 10. However, the transmission of the video signals by way of the relatively long connections 11 and the resistor 27 to the cathode 2 causes losses due to radiation of the high frequency and damping of the amplitude curve as a function of frequency, because of the detrimental parallel capacitance of the supply lead.

The high video-frequency voltage (40 – 50 $V_{p\text{-}p}$), which is passed by way of the lead 11 in this mode of operation, easily produces cross-talk because of the high voltage value with other connecting leads. Screening of the connecting lead would unacceptably increase the detrimental parallel capacitance.

In the case of high-voltage flash-over within the picture tube from the anode to the grid and cathode electrodes 31, after firing of the spark paths, a raising of the potential of the ground point on the picture tube base plate occurs as voltage pulses. The video stages on the plate connected to the chassis are protected from such voltage pulses by the relatively high inductance of the supply leads.

Figure 2:
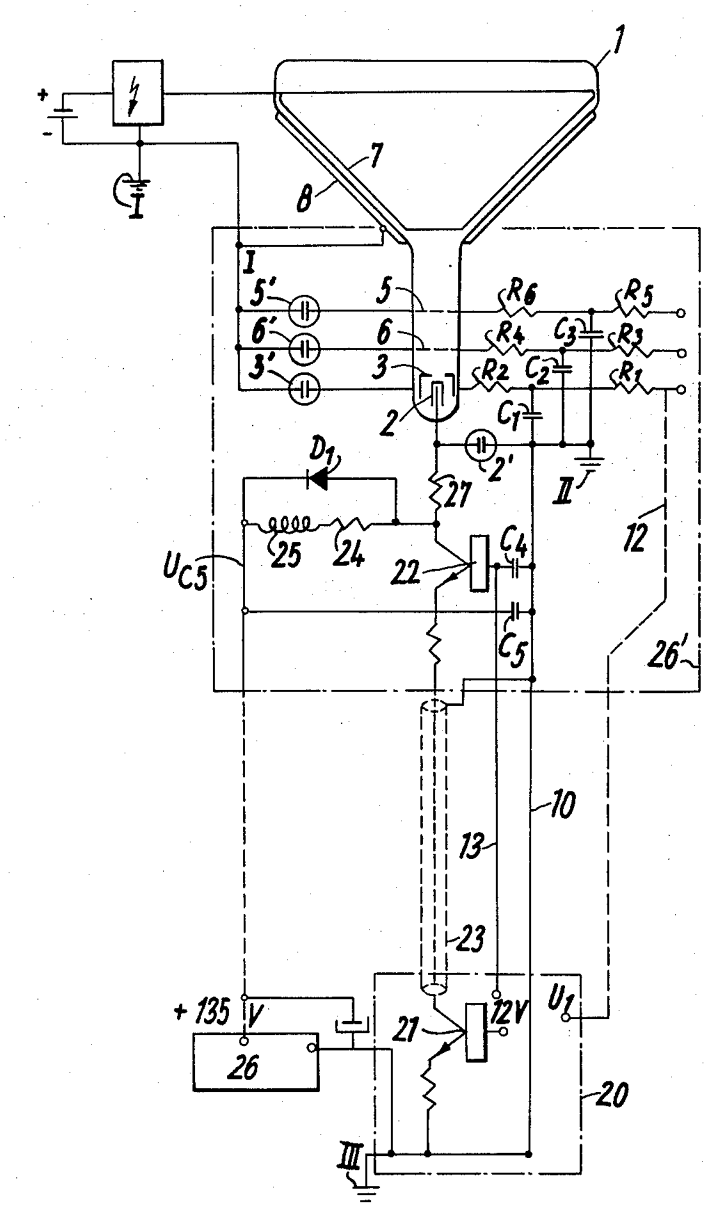
FIG. 2 is a schematic diagram of a circuit according to the invention, with control of the electrode of the beam system.

Effective protection of the transistors, with simultaneous reduction in cross-talk interference and radiation losses, is achieved by a circuit designed in accordance with the invention, as shown in FIG. 2. In this figure, the same elements as in FIG. 1 bear the same references.

In contrast to the known arrangement, in the arrangement shown in FIG. 2, disposed on a socket plate 26′ which carries the picture tube socket, the flash-over paths and the decoupling members, is the video output stage 22, the collector of which is connected by way of a resistor 27 to the cathode 2. The video stage 22, together with the transistor 21 arranged on the video circuit board 20, forms a cascade, with connection through high-frequency coaxial cable 23. The base of the upper transistor 22 is at a fixed voltage of for example +12 volts.

In this arrangement, in the case of flash-over in the tube, particularly a flash-over which breaks through to the cathode, the transistor 22 would be in serious danger. However, the present invention ensures reliable protection of the transistor 22.

For this purpose, the two ground points I and II are mounted galvanically separated on the socket plate 26′. The spark gaps 5′, 6′, and 3′ of the electrodes 5, 6 and 3 are connected to the ground point I, while the spark gap 2′ of the electrode 2 and the decoupling members C, $R_1$, $R_2$, $C_2$, $R_3$, $R_4$, and $C_3$ $R_5$ $R_6$ are connected to ground point II. When there is a flash-over from the anode 7 to the control electrodes of the picture tube, the major part of the energy is taken off to ground point I by way of the spark gaps 5′, 6′, and 3′. The remaining part which breaks through to the cathode will first lift the voltage at the video stage 22 to the value of the operating voltage corresponding to the voltage on capacitor $C_5$ and is there limited by the diode $D_1$. Then, after firing the spark gap 2′, the voltage will pass to the ground point II and raise the potential thereof with respect to ground on the video plate adjacent to the chassis. The operating voltages for the base and collector of transistor 22 are also raised by the capacitors $C_4$ and $C_5$ on the picture tube socket plate. The potential of the emitter is also raised as the video stage 22 operates in this case as an emitter-follower stage. In addition, in the case illustrated in FIG. 2, there is a coupling from ground point II to the video-supply lead by way of the cable capacitance.

This advantage can also be achieved in a modified form of the invention, which will now be described with reference to FIG. 3. In this arrangement, there is also a galvanic separation of the high-voltage ground point I and the video ground point II. However, in contrast to the preceding arrange-ment, there is a control of the Wehnelt electrode 3 with an amplification circuit which does not represent a cascade. In this arrangement, the transistor 28 is controlled by video signals at its base. Nevertheless, it can be arranged so that this transistor is not endangered by flash-over if the operating voltage leads from the chassis to the video plate are capacitively coupled to the collecting ground point II. In this circuit, there is a diode 29 between base and emitter with polarity opposite to that of the base-emitter path. Positive voltage peaks from the Wehnelt electrode cylinder 3, which before firing of the spark gap 3′ at the Wehnelt electrode, pass to the collector of transistor 28, are taken off after the value $U_1$ is reached, by way of the diode $D_1$ to the capacitor $C_5$. If after firing of gap 3′ a rise in the potential of ground point II occurs, then the base of transistor 28 is taken along by means of the diode 29. The transistor therefore remains within its voltage limits.

The invention can also be used in the case where, in a color picture tube, a color difference control is effected such that the three cathodes of the beam systems are controlled with the Y signal and the three Wehnelt electrodes are controlled with the R-Y, B-Y and G-Y signals. Then the transistor circuit shown in FIG. 3 is also used in duplicate for the other two Wehnelt electrodes, and once again for controlling the cathode.

Figure 3:
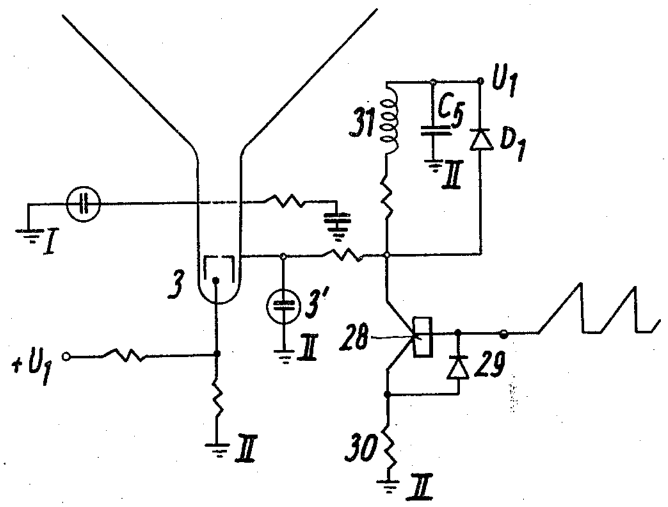
FIG. 3 is a schematic diagram of a modified embodiment of the circuit according to the invention, with control by Wehnelt electrode and cathode.
Figure 4:
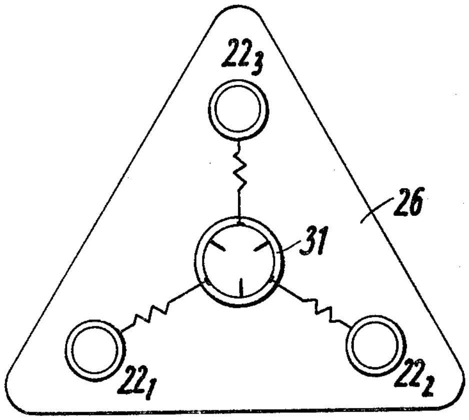
FIG. 4 is a schematic diagram view of the configuration of the output transistors of a color receiver, as seen at the tube socket.

The control of the Wehnelt cylinders can obviously be effected for RGB and color difference control, both in accordance with FIG. 2 and in accordance with FIG. 3.

1. A television receiver with a chassis and with a transistorized video amplifier arranged on a socket plate of a picture tube in the receiver with provision to protect transistors in the amplifier from excessive high voltages caused by flash-over breakdown in the picture tube, which picture tube has a group of control electrodes, a portion of which group is controlled by the video amplifier, comprising:

A. a first ground connector,

B. a second ground connector, said first and second ground connectors being respectively isolated from voltage surges on the other of said first and second ground connectors, said first and second ground connectors being connected to the chassis at separate connection points, C. means for connecting said portion of the group of control electrodes controlled by the video amplifier via a first voltage dependent discharge element to said second ground connector, D. means for connecting the rest of said group of electrodes via second voltage dependent discharge elements to said first ground connector, and E. means for capacitively coupling an operating-voltage supply line for said video amplifier to the second ground connector.

2. A receiver according to claim 1 further comprising means for capacitively coupling said rest of said group of electrodes to said second ground connector.

3. A receiver according to claim 2 further comprising:

A. a picture tube socket plate for connection to the socket of said picture tube, and B. a remotely located circuit board for carrying elements having necessary ground connections made via a third ground connector to another separate chassis ground point, and C. said video amplifier being constructed as a cascade stage of a first and a second transistor, said first transistor being mounted on said socket plate and said second transistor being mounted on said circuit board.

4. A receiver according to claim 3, further comprising a coaxial cable for interconnecting said first and said second transistor.

5. A receiver according to claim 4 further comprising a blocking diode means for bridging a base emitter path of the first transistor for operating to block when said base-emitter path is in condition to conduct.

6. A television receiver according to claim 3, comprising a plurality of voltage dependent discharge elements connected to protect each cathode, and used in a multi-beam system wherein the control transistors are arranged on the base plate in the form of a regular polygon, in the center of which is located the socket of the picture tube.

7. A television receiver according to claim 1, wherein the control transistors can be controlled both at the base and at the emitter.

8. A television receiver according to claim 1, wherein resistors are connected to the electrodes of the picture tube on the base plate, said resistors being flashover-resistant.

* * * * *